(12) United States Patent
Johansson et al.

(10) Patent No.: US 9,587,779 B2
(45) Date of Patent: Mar. 7, 2017

(54) PULSATION DAMPER SUITABLE FOR HYGIENIC PROCESSING LINES

(71) Applicant: TETRA LAVAL HOLDINGS & FINANCE S.A., Pully (CH)

(72) Inventors: Fredrik Johansson, Lund (SE); Rikard Hansson, Eslov (SE); Tomas Skoglund, Lund (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 14/767,090

(22) PCT Filed: Feb. 7, 2014

(86) PCT No.: PCT/EP2014/052477
§ 371 (c)(1),
(2) Date: Aug. 11, 2015

(87) PCT Pub. No.: WO2014/122286
PCT Pub. Date: Aug. 14, 2014

(65) Prior Publication Data
US 2016/0003398 A1    Jan. 7, 2016

(30) Foreign Application Priority Data

Feb. 11, 2013 (SE) ..................................... 1350157

(51) Int. Cl.
*F16L 55/04* (2006.01)
*F16L 55/027* (2006.01)
*B01F 13/00* (2006.01)

(52) U.S. Cl.
CPC .............. *F16L 55/04* (2013.01); *B01F 13/00* (2013.01); *F16L 55/0279* (2013.01)

(58) Field of Classification Search
USPC ...................................................... 138/26, 30
See application file for complete search history.

(56) References Cited

U.S. PATENT DOCUMENTS 2,290,337 A * 7/1942 Knauth ................... F16L 55/04
                                                    138/30
2,878,835 A * 3/1959 Peterson ................. E21B 21/00
                                                    138/130

(Continued)

FOREIGN PATENT DOCUMENTS

DE   21 15 826 A1   10/1971
DE   23 46 546 A1    1/1975

(Continued)

OTHER PUBLICATIONS

International Search Report (PCT/ISA/210) mailed on Apr. 22, 2014, by the Swedish Patent Office as the International Searching Authority for International Application No. PCT/EP2014/052477.

*Primary Examiner* — James Hook
(74) *Attorney, Agent, or Firm* — Buchanan, Ingersoll & Rooney PC

(57) ABSTRACT

A pulsation damper configured to reduce pressure variations in a pipe system. The pulsation damper comprises a first pipe section and a second pipe section. The first pipe section is at least partly placed inside the second pipe section such that a product flow can flow through the first pipe section and then through a space formed between the first pipe section and the second pipe section. Due to the increased cross sectional area of the second pipe section pressure variations can be damped efficiently.

20 Claims, 7 Drawing Sheets

(56) References Cited

U.S. PATENT DOCUMENTS

| | | | | |
|---|---|---|---|---|
| 2,956,586 A * | 10/1960 | Zeigler | ............... | F15B 21/00 |
| | | | | 137/563 |
| 3,157,202 A * | 11/1964 | Sadler | ............... | F16L 55/052 |
| | | | | 138/26 |
| 3,461,914 A * | 8/1969 | Sugimura | ............ | F15B 1/10 |
| | | | | 138/30 |
| 3,625,242 A * | 12/1971 | Ostwald | ............... | F15B 1/16 |
| | | | | 138/30 |
| 4,232,762 A * | 11/1980 | Bschorr | ............ | G10K 11/16 |
| | | | | 138/26 |
| 4,651,781 A * | 3/1987 | Kandelman | ......... | F15B 1/086 |
| | | | | 138/26 |
| 4,872,486 A * | 10/1989 | Sugimura et al. | ....... | F15B 1/10 |
| | | | | 138/30 |
| 4,979,441 A | 12/1990 | Welch et al. | | |
| 5,201,343 A * | 4/1993 | Zimmermann | ..... | F16L 55/0331 |
| | | | | 138/109 |
| 5,709,248 A * | 1/1998 | Goloff | ................. | F15B 1/086 |
| | | | | 138/26 |
| 5,718,952 A * | 2/1998 | Zimmermann et al. | .. | F16L 9/18 |
| | | | | 137/383 |
| 6,063,275 A * | 5/2000 | Traylor | ............... | B01D 61/10 |
| | | | | 138/30 |
| 7,278,837 B2 | 10/2007 | Malmberg et al. | | |
| 2002/0059959 A1* | 5/2002 | Qatu | ................... | F16L 55/04 |
| | | | | 138/30 |
| 2002/0134446 A1* | 9/2002 | Baltes | ................. | F15B 1/165 |
| | | | | 138/30 |

FOREIGN PATENT DOCUMENTS

GB            875 482 A     8/1961
GB           2 129 876 A    5/1984

* cited by examiner

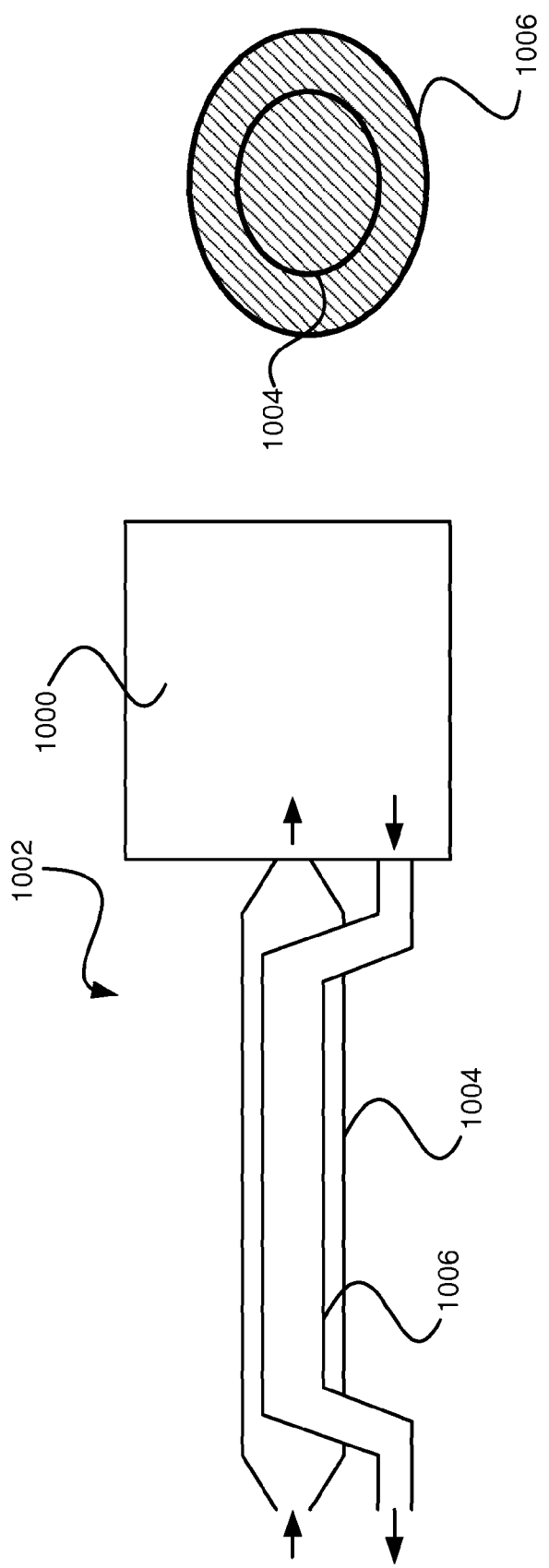

PULSATION DAMPER SUITABLE FOR HYGIENIC PROCESSING LINES

TECHNICAL FIELD

The invention generally relates to the field of processing technology. More particularly, it relates to a pulsation damper for reducing the influence of pressure variations generated for instance by a homogenizer comprising a piston pump.

BACKGROUND OF THE INVENTION

Today, in processing systems it is common practice to have dampers for a piston pump. By having the dampers the pressure peaks formed when the pistons are moving back and forth are reduced and hence the negative effects for the homogenizer as well as other parts of the systems can be reduced.

One common type of pulsation dampers used in this field is partly air filled upright tubes placed upstream and downstream the piston pump. In short, when a pressure peak arises the air is compressed, thereby resulting in a damping effect. One disadvantage of this design is that it is most often cleaned manually since the air filled upright tube constitutes a dead end and hence is difficult to clean automatically using cleaning in place (CIP) procedures.

Another disadvantage is that the air will be consumed over time due to that the air is dissolved in a liquid product being processed. Thus, also for this reason, this kind of pulsation dampers needs to be filled with air from time to time.

In U.S. Pat. No. 7,278,837 it is suggested to connect the two pulsation dampers with each other via a tube provided with a shut off valve. Thanks to the tube connecting the two pulsation dampers the pulsation dampers may be cleaned automatically.

Another type of pulsation damper is described in GB 2 129 876. The pulsation damper consists essentially of a centre zone with non-circular sections so that it may flex under pressure towards a circular section and resiliently expand to absorb the pulsations.

Although different types of pulsation dampers have been developed there is still a need for cost efficient damper solutions providing for efficient damping, robust design, secured hygiene and low total cost of ownership.

SUMMARY

Accordingly, the present invention preferably seeks to mitigate, alleviate or eliminate one or more of the above-identified deficiencies in the art and disadvantages singly or in any combination and solves at least the above mentioned problems e.g. by providing a pulsation damper capable of damping the pulsation formed by pistons and yet being possible to clean using automatic cleaning in place procedures.

According to a first aspect it is provided a pulsation damper configured reduce pressure variations in a pipe system. The pulsation damper may comprise a first pipe section and a second pipe section. The first pipe section being at least partly placed inside said second pipe section, such that a product flow can flow through said first pipe section and through a space formed between said first pipe section and said second pipe section.

The first pipe section may be made of an elastic material.

The second pipe section may be made of an elastic material.

The second pipe section may be connected to a piston pump arrangement, such as a homogenizer.

The second pipe section may have a non-circular cross section in at least one point.

The non-circular cross section may have an elliptical cross section.

The first pipe section may have a non-circular cross section, such as an elliptical cross section, in at least one point.

A first cross sectional area being a cross sectional area of said first pipe section may be essentially the same as a second cross sectional area being a cross sectional area of said space formed between said first pipe section and said second pipe section.

The pulsation damper may further comprise a volume adding element placed in said first pipe section.

A third cross sectional area being a cross sectional area of a space formed between said first pipe section and said volume adding element may be essentially the same as a second cross sectional area being a cross sectional area of said space formed between said first pipe section and said second pipe section.

The first pipe section may be arranged to enter in a mid section of said second pipe section.

The pulsation damper may further comprise a third pipe section, wherein said second pipe section may be at least partly placed inside said third pipe section.

The third pipe section may have a non-circular cross section, such as an elliptical cross section, in at least one point.

The first pipe section may enter said third pipe section in an end section.

According to a second aspect it is provided a pulsation damper system comprising a first pulsation damper according to the first aspect, said first pulsation damper being connected to an outlet of a piston pump arrangement, and a second pulsation damper comprising a second pulsation damper pipe section, said first pulsation damper being placed inside said second pulsation damper pipe section, and said second pulsation damper pipe section being connected to an inlet of said piston pump arrangement.

According to a third aspect it is provided a processing line comprising a piston pump, and a pulsation damper according to the first aspect.

According to a fourth aspect it is provided a homogenizer comprising a piston pump, a homogenizing device, and a pulsation damper according to the first aspect.

According to a fifth aspect it is provided a food processing line comprising a homogenizer according to the fourth aspect.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, wherein:

FIG. 7b generally illustrates a cross section of the pulsation damper illustrated in FIG. 7a.

FIG. 8b generally illustrates a cross section of the pulsation damper illustrated in FIG. 8a.

FIGS. 10a and 10b generally illustrate an example of a pulsation damper comprising first and second elliptical pipe section connected to an inlet and an outlet, respectively.

FIG. 11b generally illustrates a cross section of the pulsation damper illustrated in FIG. 11a.

DETAILED DESCRIPTION OF PREFERRED EMBODIMENTS

Figure 1:
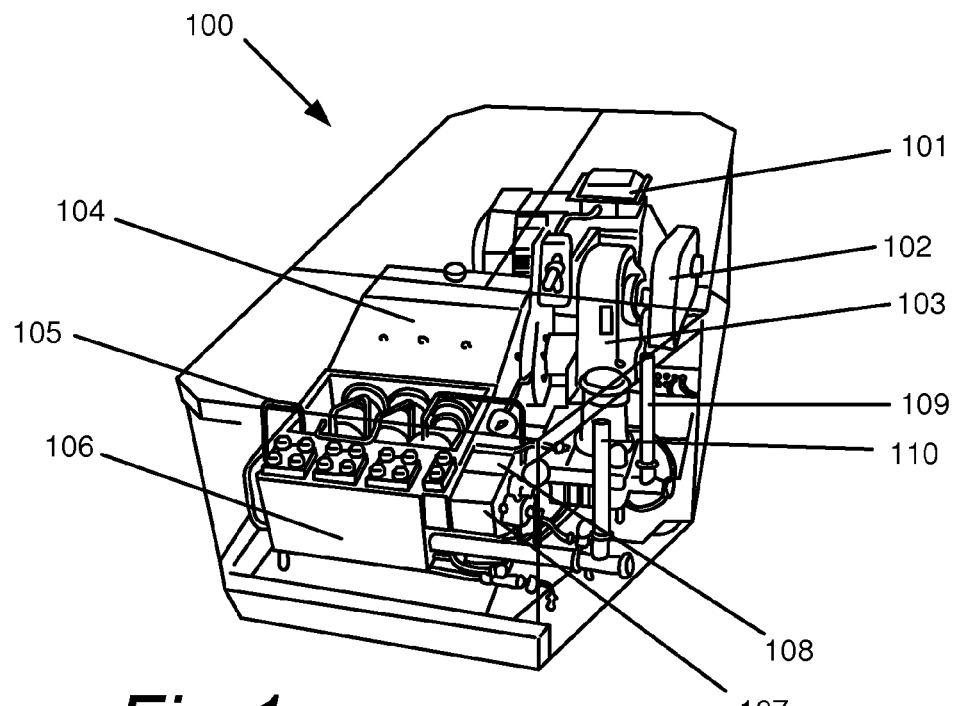
FIG. 1 generally illustrates a homogenizer.

FIG. 1 generally illustrates a homogenizer 100, more particularly a homogenizer sold under the name Tetra Alex™ by Tetra Pak. Generally speaking, the homogenizer 100 comprises two main parts, a high pressure pump and a homgenising device. The high pressure pump forms a high pressure and the homogenising device provides one or several gaps through which the product is forced with the effect that the size of the fat globules are decreased. Further effects of homogenization is more appetizing colour, reduced sensitivity to fat oxidation, more full-bodied flavour and better stability of cultured milk products.

In this example, the high pressure pump is a piston pump driven by a main drive motor 101 connected via a belt transmission 102 and a gearbox 103 to a crankshaft placed in a crankcase 104. By using the crankshaft the rotary motion is converted to a reciprocating motion driving pump pistons 105 back and forth. Today, it is common to have three to five pump pistons, but both fewer and more pistons may be used as well.

The pump pistons 105 run in cavities formed in a pump block 106 made to withstand the high pressure created by the pump pistons. Today it is common to increase the pressure from 300 kPa (3 bar) to about 10-25 MPa (100-250 bar), but higher pressures can be used as well.

Through cavities in the pump block 106 the product enters a first homogenizing device 107 and thereafter, in many cases, a second homogenizing device 108. As described above, by forcing the product through one or several gaps the properties of the product can be changed.

The reciprocating motion of the pump pistons 105 creates pulsations. To reduce the pulsations it is common practice today to place an inlet damper 109 on an inlet of the homogenizer. Further, in order to reduce vibrations and noise it is common practice to place an outlet damper 110 on an outlet.

The inlet damper 109 and the outlet damper 110 may as illustrated in FIG. 1 be vertical pipe sections placed next to the inlet and outlet.

Figure 2:
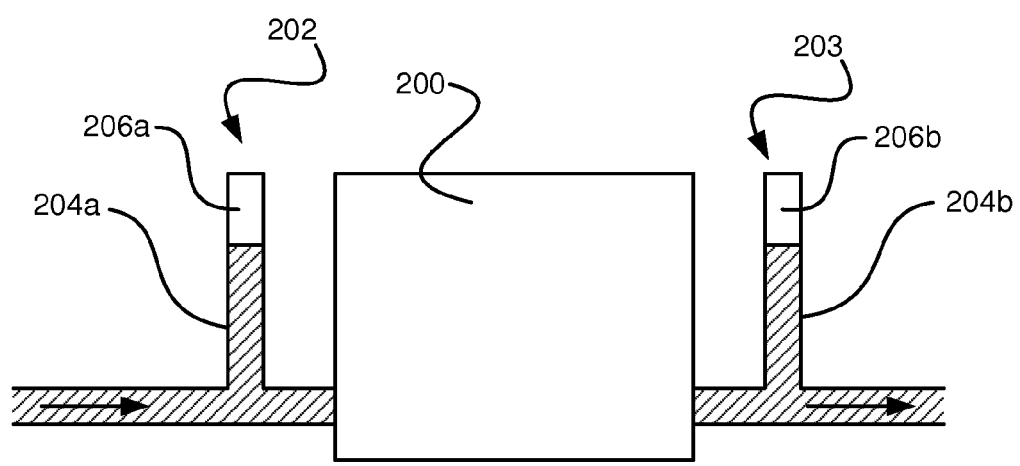
FIG. 2 generally illustrates a homogenizer provided with air filled vertical pipes as pulsation dampers.

FIG. 2 illustrates a homogeniser 200 provided with an inlet damper 202 and an outlet damper 203. Both the inlet damper 202 and the outlet damper 203 comprise a first section 204a, 204b filled with liquid product and a second section 206a, 206b filled with air. Since the dampers are closed at the top the air can be compressed and in this way function as a damping medium. Hence, when a pulsation reaches the inlet damper 202 or the outlet damper 203 the air will be compressed and in this way part of the kinetic energy of the pulsation is transformed into static energy with the effect that the pulsation amplitude is reduced.

The drawback of having vertical pipes closed in the upper ends as dampers is that they are difficult to clean by using common cleaning in place (CIP) technology. Therefore, in order to clean these they are usually dismounted and cleaned manually. This is both labour intensive and reduces the uptime for the entire line, which of course is a disadvantage.

In order to solve this problem different solutions with by-pass valves have been developed. The main idea with these solutions are to have one mode for production when the upper ends are closed, for instance by closing one or several valves, and another mode during cleaning when the valves are open such that water and cleaning agents can flow through the pipes.

Figure 3:
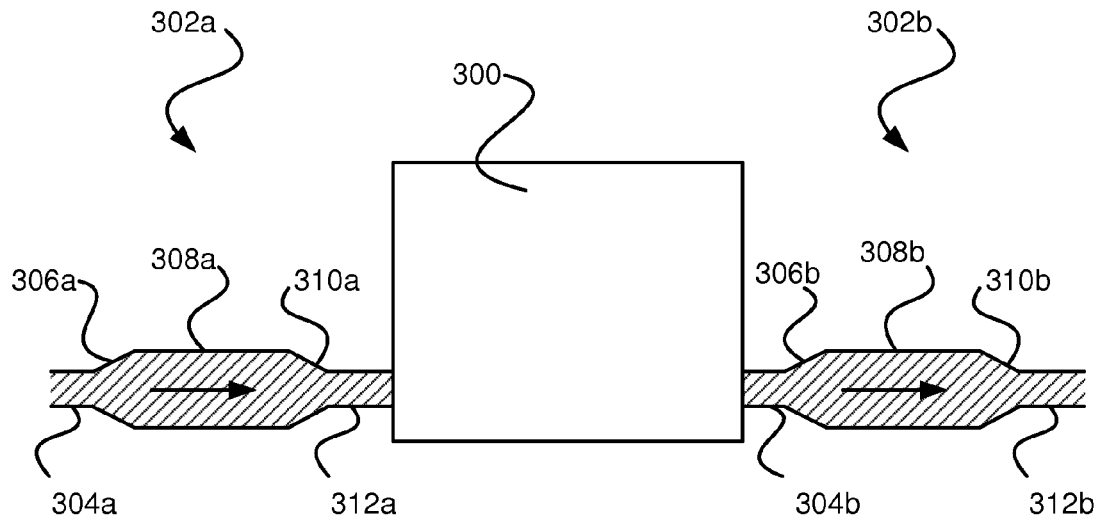
FIG. 3 generally illustrates a homogenizer provided with pulsation dampers in the form of elliptical pipe sections.

FIG. 3 illustrates an example set up comprising a homogenizer 300 provided with an inlet damper 302a and an outlet damper 302b. In the example the inlet damper 302a and the outlet damper 302b are both provided with an elliptical cross section. Other options are to only have the inlet damper 302a provided with an elliptical cross-section, or to only have the outlet damper 302b provided with an elliptical cross-section.

In this example, for both the inlet damper 302a and the outlet damper 302b, a first connection pipe 304a, 304b, which can be a stainless steel pipe with a circular cross section, is attached to a first transition section 306a, 306b in turn connected to a damper section 308a, 308b with an elliptical cross section. The damper section 308a, 308b can in turn be connected to a second transition section 310a, 310b, in turn connected to a second connection pipe 312a, 312b, which also can be a stainless steel pipe with a circular cross section. An advantage of having the first connection pipe 304a, 304b and the second connection pipe 312a, 312b provided with a circular cross section is that today's standard connections can be used.

As illustrated in FIG. 3, in order to provide for a good damping efficiency the damper section 308a, 308b may have a larger cross sectional area compared to the first connection pipes 304a, 304b and the second connection pipes 3012a, 312b. On the other hand, in order to provide for efficient cleaning, more particularly cleaning in place (CIP), the cross sectional area of the damper section 308a, 308b should not be too much larger compared to the connection pipes since this will lead to less efficient cleaning in the damper sections 308a, 308b.

Figures 4A, 4B:
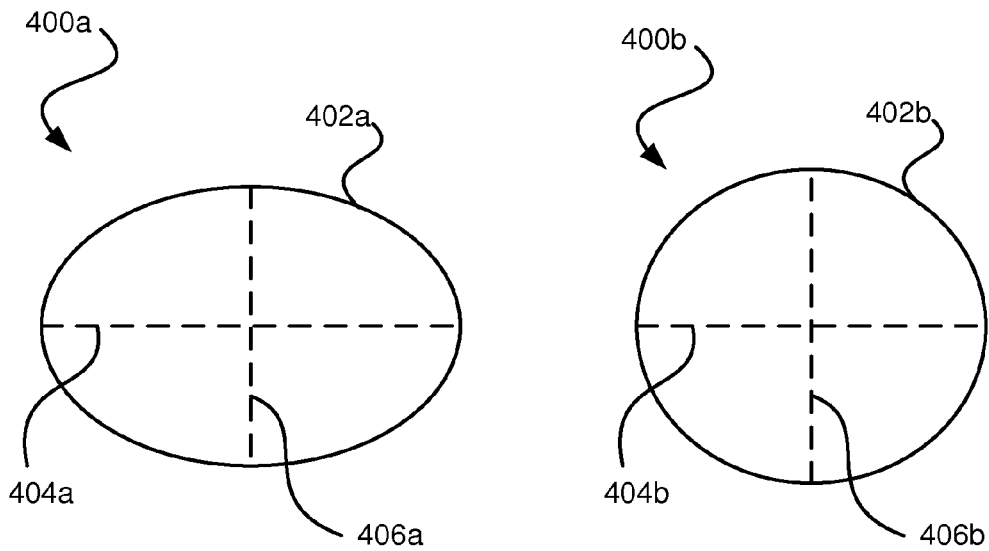
FIG. 4a illustrates a cross section of an elliptical damper section in a low pressure state.
FIG. 4b illustrates a cross section of an elliptical damper section in a high pressure state.

By having elliptical damper sections 308a, 308b made in an elastic material, such as stainless steel, the elliptical damper sections may change from a low pressure state with an elliptical cross section, as illustrated by example in FIG. 4a, to a high pressure state, i.e. higher pressure, with a less elliptical cross section, or put differently a more circular cross section, as illustrated by example in FIG. 4b. In the high pressure state, the damper section 308a, 308b will be able to hold a larger volume compared to the low pressure state providing for that the pulsation will be damped.

As stated above, the cross sectional area of the damper sections 308a, 308b should not differ too much from the cross sectional area of the connection pipes in order to provide for efficient cleaning in place (CIP). It has however been realized that by only having the damper section capable of compensating for a small volume, the pulsations can be significantly reduced. Therefore, due to the small volume required for damping pulsations, it has been realized that elliptical damper sections 308a, 308b that can reduce pulsations efficiently and that can be cleaned efficiently is possible to achieve.

As illustrated in FIG. 4a, in the non-pulsation mode, a cross section 400a of the damper section can be elliptical. A circumference 402a, and a major axis 404a and a minor axis 406a are illustrated. The major axis 404a can be greater than the minor axis 406a in the low pressure state.

When a pulsation, i.e. pressure peak, enters the damper section, the damper section can due to the elasticity of the stainless steel, or other elastic material used for the damper section, force the cross section to go towards a more circular cross section 400b, as illustrated in FIG. 4b, to a so-called high pressure state. By doing so the volume held in the damper section will increase in turn having the effect that the pulsation is reduced. A circumference 402b in this mode is more or less the same as in the low pressure state. However, a major axis 404b will be reduced and correspondingly the minor axis 406b will be increased.

In order to provide for a long lasting damper section, the damper section can be made as an elliptical element, for instance by using hydroforming.

Further, in order to provide for an efficient damping, a long lasting damper section or that the amount of material used is kept at a low level the thickness of the damper section may differ between different parts of the damper section, both around the periphery, but also over a length of the damper section.

Figure 5:
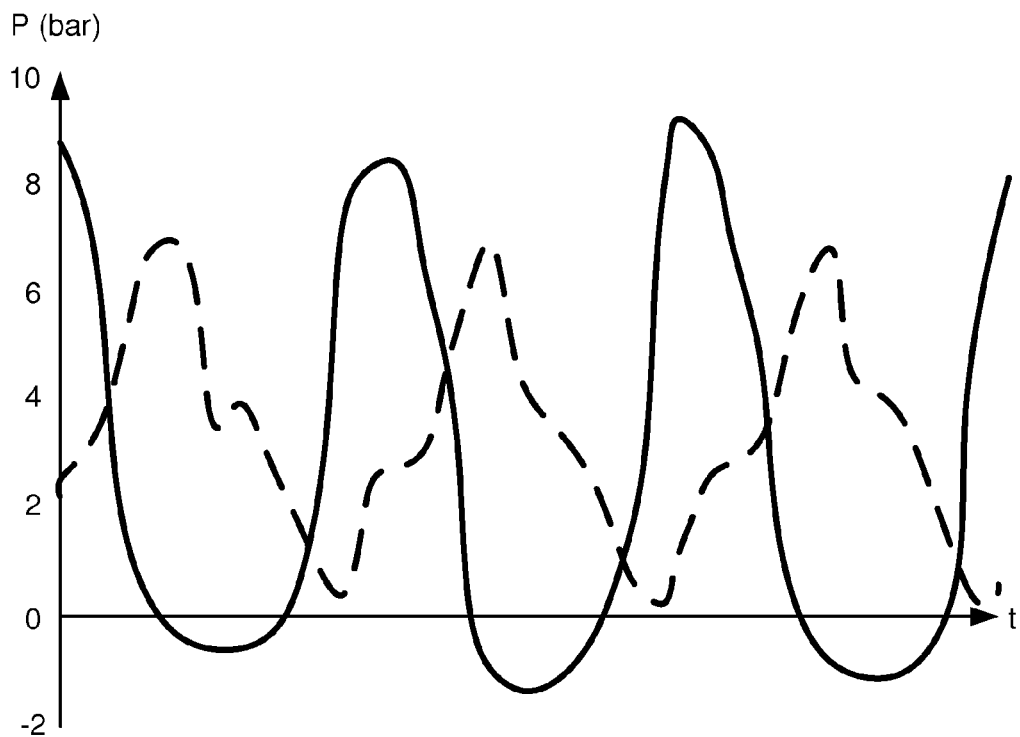
FIG. 5 illustrates by example a graph showing pressure variations when using a pipe section with circular cross section as pulsation damper.

FIG. 5 illustrates a graph showing measured pressure before and after a homogenizer capable of providing a homogenization pressure of 20 MPa (200 bar) in a food processing line having a feed pressure of 300 kPa (3 bar) and as an inlet damper and as an outlet damper having a circular pipe section having an inlet diameter of 101.6 mm, an outlet diameter of 76 mm, a thickness of 2 mm and a length of about 2 m made of stainless steel. The dotted line illustrates the pressure before the homogenizer and the full line illustrates the pressure after the homogenizer. As illustrated, the pressure before the homogenizer will be in the range from about 100 kPa (1 bar) to about 700 kPa (7 bar). After the homogenizer the pressure will vary even more, from about −100 kPa (−1 bar), that is back pressure, to about 900 kPa (9 bar).

Figure 6:
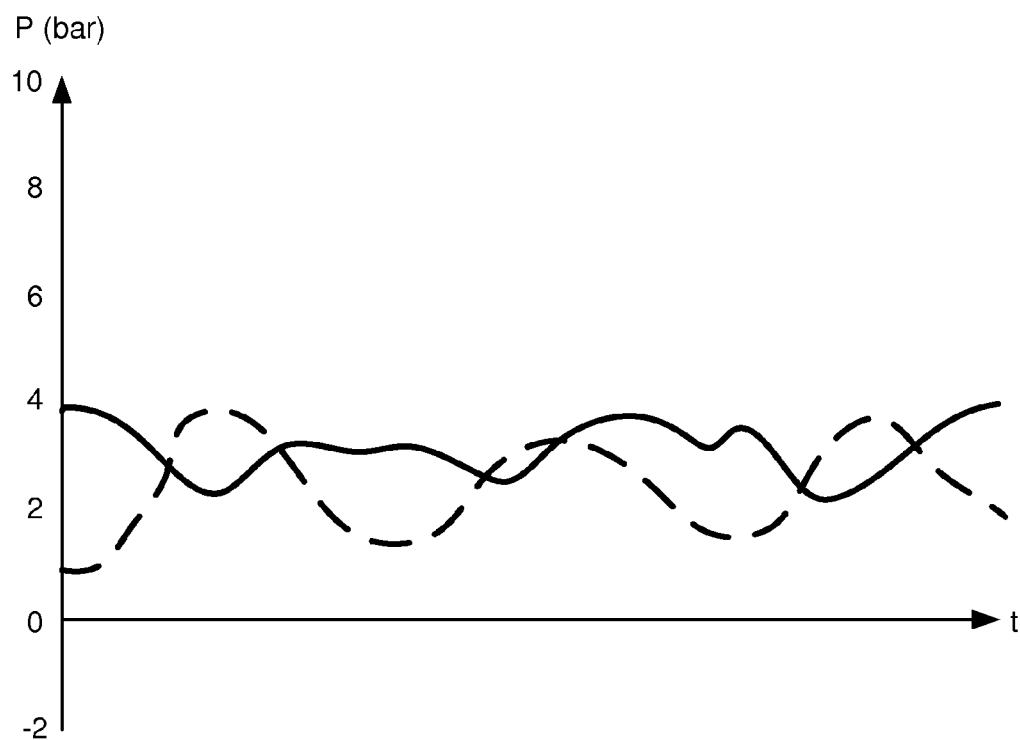
FIG. 6 illustrates by example a graph showing pressure variations when using a pipe section with elliptical cross section as pulsation damper.

FIG. 6 illustrates a graph showing measured pressure before and after the homogenizer with the same conditions as set forth above, but with the difference that instead of having the circular pipe section this is replaced by an elliptical pipe section with a major axis of 106 mm and a minor axis of 89 mm, otherwise similar. As illustrated, the measured pressure before the homogenizer (dotted line) varies between 200 kPa (2 bar) and 400 kPa (4 bar), and the measured pressure after the homogenizer (full line) varies between 100 kPa (1 bar) and 400 kPa (4 bar).

In the example illustrated in FIG. 5 and FIG. 6, when raising pressure from 300 kPa (3 bar) to 400 kPa (4 bar) the elliptical pipe section will move towards a more circular cross section having the effect that an increased volume can be held.

Figure 7B:
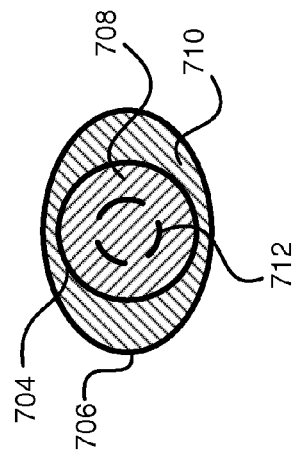
Figure 7A:
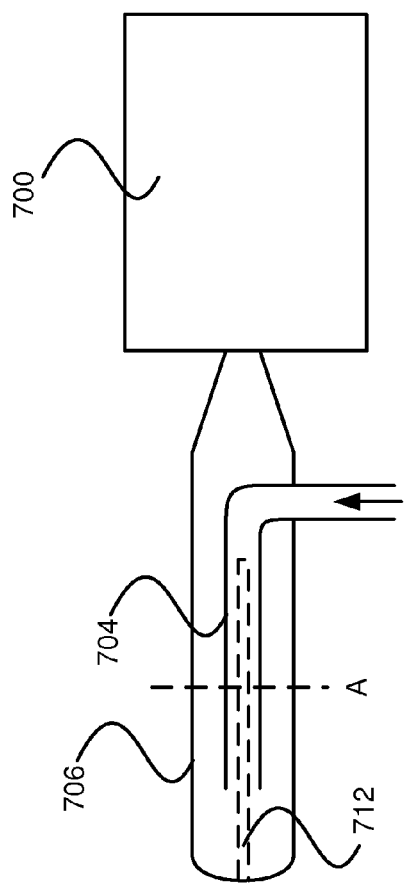
FIG. 7a generally illustrates an example of a homogenizer provided with a pulsation damper on its inlet.

FIGS. 7a and 7b illustrate an example set up of a homogenizer 700, or any other apparatus forming pulsations, provided with a pulsation damper 702 on its inlet. The pulsation damper 702 can comprise a first pipe section 704 and a second pipe section 706. As illustrated, the first pipe section 704 can be partly placed inside the second pipe section 706 with the effect that product can flow inside the first pipe section 704 and then after having left the first pipe section 704 in a space formed between the first pipe section 704 and the second pipe section 706. In FIG. 7b, which is a cross sectional view along the line referred to as A in FIG. 7a, this is further illustrated.

As illustrated in FIGS. 7a and 7b, the second pipe section 706 may be elliptical with the advantage that it may flex towards a more circular cross section with the effect that a larger volume can be held and hence give rise to improved damping efficiency, as further explained above. However, an advantage with the pulsation damper 702, more particularly with the approach of placing the first pipe section inside the second pipe section, is that a cross sectional area of the second pipe section may be large without giving rise to cleaning difficulties. A large cross sectional area namely has the positive effect that a difference in volume held in the low pressure state and the high pressure state can be increased.

In order to keep the same velocity, or at least a similar velocity, of product flow in the first pipe section 704 as in the space between the first pipe section 704 and the second pipe section 706, the pulsation damper 702 may be designed such that a first cross sectional area 708 of the first pipe section 704 is equal to a second cross sectional area 710 of the space formed between the first pipe section 704 and the second pipe section 706.

An effect of having the first pipe section 704 placed inside the second pipe section 706 may be that pulsations may be damped due to the elasticity of the first pipe section 704. More particularly, as an example, a pulsation forming a lowered pressure in the space between the first and second pipe section and an increased pressure in the first pipe section may be damped due to that the cross sectional area 708 of the first pipe section 704 is increased. A further example is that a pulsation forming an increased pressure in the space between the first and second pipe section sections and a lowered pressure in the first pipe section may be damped due to that the cross sectional area 708 of the first pipe section is decreased. Further, in combination or on its own, the second pipe section may flex outwards such that the second cross sectional area 710 is increased. The second pipe section may be made of an elastic material and may have an elliptical cross section.

Further, even though not illustrated, the pulsation damper 702 may alternatively be placed on an outlet of the homogenizer 700. Still an alternative is to have pulsation dampers placed on both the inlet and the outlet.

When having the pulsation damper 702 placed on the outlet of the homogenizer, an option is to have the first pipe 704 connected to the homogenizer 700, instead of the second pipe 706 as illustrated.

Further, as an option, a volume adding element 712 may be introduced in the first section 704 as illustrated. An advantage of having the volume adding element is that cross sectional areas of the first pipe section 704 and the second pipe section 706 may be larger, resulting in improved damping efficiency.

Figure 8B:
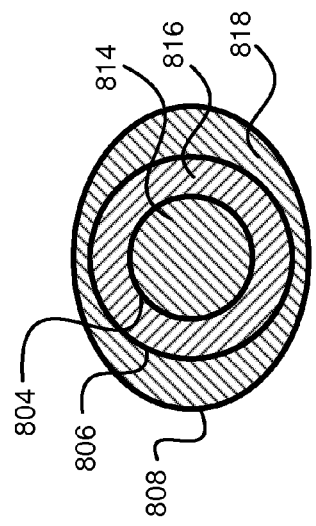
Figure 8A:
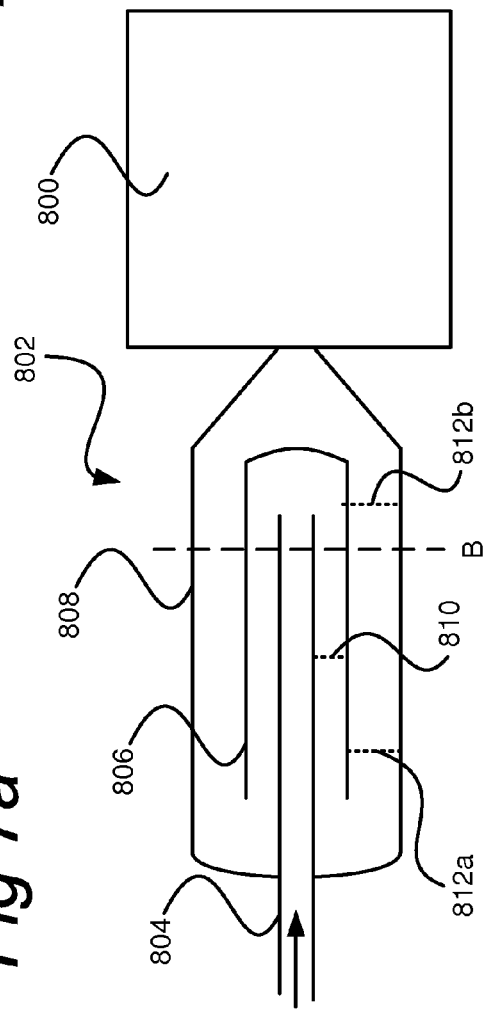
FIG. 8a generally illustrates another example of a homogenizer provided with a pulsation damper on its inlet.

FIGS. 8a and 8b illustrate another example set up of a homogenizer 800, or any other apparatus forming pulsations, and a pulsation damper 802.

The pulsation damper 802 can comprise a first pipe section 804, a second pipe section 806 and a third pipe section 808. As illustrated, the first pipe section 804 is partly placed inside the second pipe section 806, which in turn is placed inside the third pipe section 808. The second pipe section 806 is closed in one end providing for that the product is fed from the first pipe section 804 to a space formed between the first pipe section 804 and the second pipe section 806. The third pipe section 808 can be closed around the first pipe section in one end and connected to the homogenizer 800 in the other end, thereby providing for that the product is fed from the space between the first pipe section 804 and the second pipe section 806 to a space between the second pipe section 806 and the third pipe section 808 and into the homogenizer. In the illustrated example the third pipe section 808 is connected to an inlet of the homogenizer, but it can be connected to the outlet as well.

In order to keep the first pipe section 804 in position a first supporting element 810, herein illustrated as one supporting element, but several supporting elements may be used as well, may be attached to the first pipe section 804 and the second pipe section 806. Further, in a similar way, in order to keep the second pipe section 806 in position, one or several second supporting elements 812a, 812b may be attached to the second pipe section 806 and the third pipe section 808. The number of supporting elements, how the supporting elements are placed and the design of the supporting elements may vary for different configurations and the first supporting element and the second supporting elements are therefore only to be seen as one example of many alternatives.

Further, since the third pipe section 808 is attached to the homogenizer the second supporting elements 812a, 812b are to be considered as optional.

In order to keep the same velocity, or at least a similar velocity, of product flow in the first pipe section 804 as in the space between the first pipe section 804 and the second pipe section 806, the pulsation damper 802 may be designed such that a first cross sectional area 814 of the first pipe section 804 is equal to a second cross sectional area 816 of the space formed between the first pipe section 804 and the second pipe section 806. Further, a third cross sectional area 818 of a space formed between the second pipe section 806 and the third pipe section 808 may be designed such that this is equal to the first cross sectional area 814 and the second cross sectional area 816.

As described above with reference to the example illustrated in FIGS. 7a and 7b, the first pipe section may flex inwards or outwards for damping pulsations, and the second pipe section may flex outwards for the same purpose. Having the third pipe section 808, the second pipe section 806 may also flex inwards for damping pulsations. Further the third pipe section 808 may flex outwards for damping pulsations. As illustrated in FIG. 8a and FIG. 8b the third pipe section 808 may have an elliptical cross section at least in one point.

Since the cross sectional area of an outer pipe section, e.g. the second pipe section 706 in FIG. 7a, FIG. 7b and the third pipe section 808 in FIG. 8a, FIG. 8b, is larger than inner pipe section(s), e.g. the first pipe section 704 and the first pipe section 804 and the second pipe section 806, the outer pipe section can be chosen to be elliptical in order to achieve a good damping efficiency.

In the examples illustrated in FIG. 7a, 7b, 8a, 8b, the inner pipe(s) can be chosen to have circular cross sections in order to keep costs down and since, in case pipes with elliptical cross sections were chosen, the resulting damping effect would be limited. Instead the inner pipe(s) has/have the purpose of providing for that the outer pipe section can have a large cross sectional area providing for efficient damping.

Further, in a corresponding manner, pulsation dampers having four or more pipe sections are possible as well.

Figure 9:
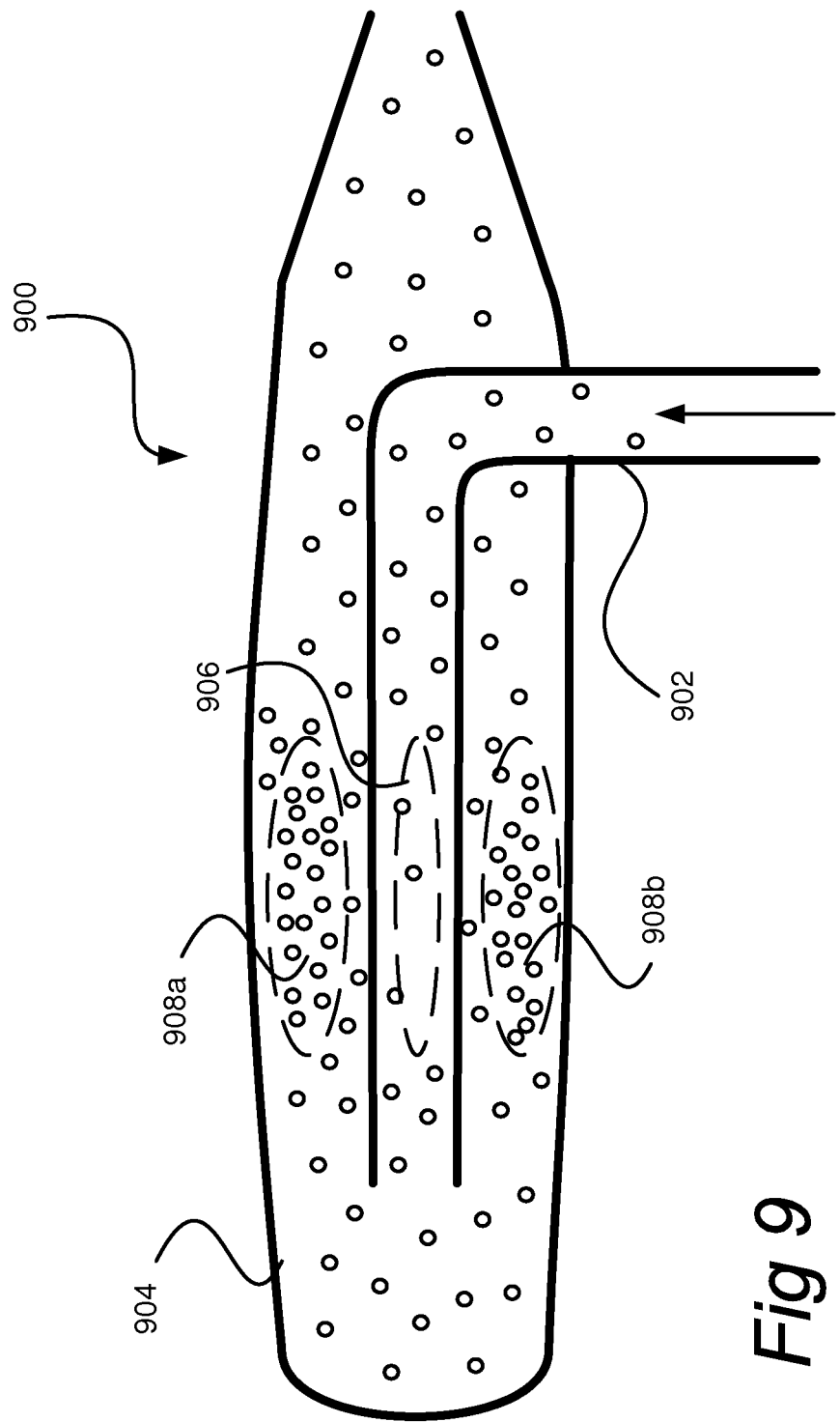
FIG. 9 generally illustrates one way of damping pulsations using a pulsation damper provided with a first pipe section partly placed inside a second pipe section.

FIG. 9 illustrates a cross sectional view of a pulsation damper 1000 comprising a first pipe section 902 and a second pipe section 1004. As illustrated, the first pipe section 902 is partly placed inside the second pipe section 904.

For illustrative purposes, different pressure at a certain point of time in the pulsation damper 900 are depicted by circles. A region 906 inside the first pipe section 902 has a low pressure compared to a region 908a, 1008b (surrounding the first pipe section) having a high pressure. In order to compensate for the high pressure in region 908a, 908b the second pipe section 904 flex outwards thereby increasing a cross sectional area of the second pipe section 904 with the effect that the pulsation is damped.

In order to have an improved damping effect the second pipe section may be elliptical, as illustrated in FIG. 7.

By having a pipe in pipe solution a diameter of the second pipe section 904 may be larger than a diameter of the damper sections 308a, 308b illustrated in FIG. 3. An implication of this is that a difference in volume between a low pressure state, when no flexing occurs, and a high pressure state, when flexing outwards occur, can be bigger for the second pipe section compared to the damper sections illustrated in FIG. 3, thereby providing for improved damping functionality. This improved damping functionality could be in terms of magnitude of the pressure peaks that can be damped. In other words, using a pulsation damper based on the pipe in a pipe solution, exemplified in FIG. 7a,7b, 8a, 8b, 9 and 10, can have the effect that pressure peaks of a greater magnitude can be damped compared to the pressure peaks damped by using single elliptical pipes as illustrated in FIG. 3.

FIGS. 10a and 10b illustrates a homogenizer 1000 and a pulsation damper 1002 connected thereto. Unlike the previously presented examples a combined pulsation damper is provided. Incoming product is fed through a first pipe section 1004 to an inlet of the homogenizer 1000. Outgoing product is fed through a second pipe section 1006 connected to an outlet and surrounding the first pipe section 1004. As illustrated, both the first pipe section 1004 and the second pipe section 1006 may have non-circular cross sections, such as elliptical cross sections, in order to flex between a high pressure state and a low pressure state as explained above. In some situations, depending on the homogenizer 1000 or other piece of equipment forming pulsations, an effect of combining the inlet and the outlet may be that different pressures in the first pipe section 1004 and the second pipe section 1006 compensate each other and thereby reduces the pulsations. Further, by having the first pipe section 1002 in the second pipe section 1004, the cross sectional area of the second pipe section 1006 may be increased, thereby providing for improved damping, as explained above.

Figure 11A:
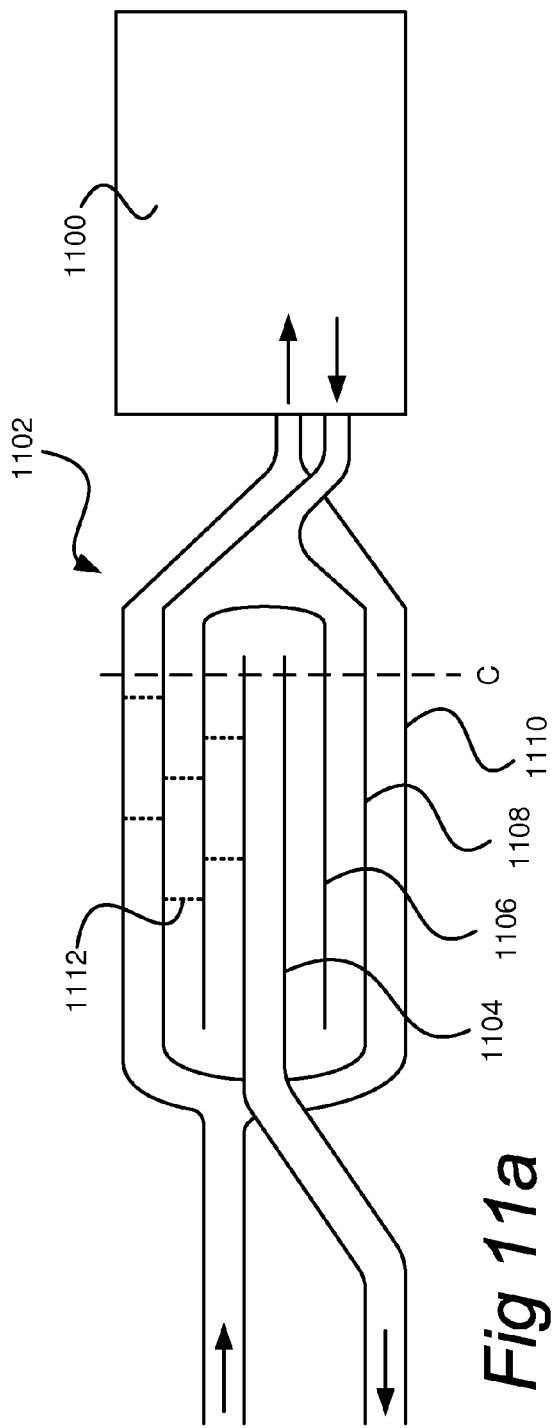
FIG. 11a generally illustrates yet another example of a homogenizer provided with a pulsation damper on its inlet.
Figure 11B:
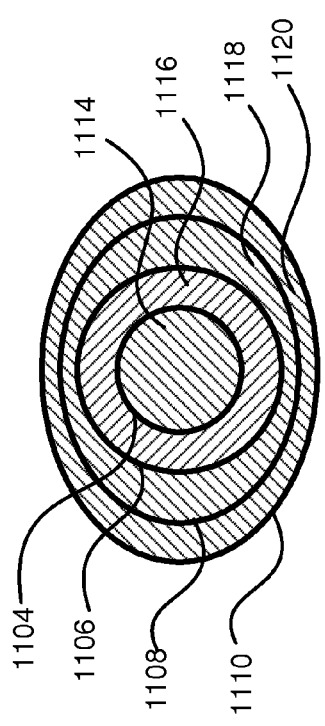

FIGS. 11a and 11b illustrate another example set up of a homogenizer 1100, or any other apparatus forming pulsations, and a pulsation damper 1102.

Similar to the pulsation damper illustrated in FIGS. 8a and 8b, a first pipe section 1104 is partly placed inside a second pipe section 1106 in turn placed inside a third pipe section 1108. However, unlike the pulsation damper illustrated in FIGS. 8a and 8b, the third pipe section 1108, and thereby also the first pipe section 1104 and the second pipe section 1106, may be placed inside a fourth pipe section 1110.

As illustrated, the first pipe section 1104, the second pipe section 1106 and the third pipe section 1108 may be connected to an outlet of the homogenizer 1100 and the fourth pipe section may be connected to an inlet of the homogenizer 1100.

In order to keep the first pipe section 1104, the second pipe section 1106 and the third pipe section 1108 in position supporting element 1112 may be used.

As illustrated in FIG. 11*b*, the first pipe section 1104 and the second pipe section 1106 may be circular, and the third pipe section 1108 and the fourth pipe section 1110 may be elliptical. One reason for having pipes with large cross sectional areas elliptical is, as explained above, that a volume difference is bigger when a big elliptical pipe flex towards a circular cross section compared to pipes with small cross sectional areas.

Further, in order to keep the same velocity, or at least a similar velocity, of product flow in the first pipe section 1104 as in the space between the first pipe section 1104 and the second pipe section 1106, the pulsation damper 1102 may be designed such that a first cross sectional area 1114 of the first pipe section 1104 is equal to a second cross sectional area 1116 of the space formed between the first pipe section 1104 and the second pipe section 1106. Further, a third cross sectional area 1118 of a space formed between the second pipe section 1106 and the third pipe section 1108 may be designed such that this is equal to the first cross sectional area 1114 and the second cross sectional area 1116. In addition, a fourth cross sectional area 1120 of a space between the third pipe section 1108 and a fourth pipe section 1110 may be designed such that this is equal to the first cross sectional area 1114, the second cross sectional area 1116 and the third cross sectional area 1118.

Further, though not illustrated, the idea of connecting the inlet and the outlet of the homogenizer may be used also for the damper solution illustrated in FIG. 7*a*, 7*b*. More particularly, the second pipe section 706 may be surrounded by an elliptical pipe section connected to the outlet similar to the fourth pipe section 1110 in FIG. 11.

Further, although homogenizers comprising piston pumps are used as examples herein, the pulsation dampers can be used for any piece of equipment forming pulsations, such as roll fed filling machines using sealing jaws for transversal sealing marketed by Tetra Pak as Tetra Brik filling machines.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A pulsation damper configured to reduce pressure variations in a pipe system,
    said pulsation damper comprising a first pipe section and a second pipe section,
    said first pipe section being at least partly placed inside said second pipe section, such that a product can flow through said first pipe section and through a space formed between said first pipe section and said second pipe section, and
    the first pipe section possessing a cross-sectional shape enclosing a volume and being made of an elastic material so that when pressure inside the first pipe section increases from a lower pressure state to a higher pressure state, the cross-sectional shape of the first pipe section changes to increase the volume in the first pipe section and thereby damp pulsation.

2. The pulsation damper according to claim 1, wherein said second pipe section is connected to a piston pump arrangement.

3. The pulsation damper according to claim 1, wherein said second pipe section has a non-circular cross section in at least one point.

4. The pulsation damper according to claim 3, wherein said non-circular cross section has an elliptical cross section.

5. The pulsation damper according to claim 1, wherein said first pipe section has a non-circular cross section in at least one point.

6. The pulsation damper according to claim 1, wherein a first cross sectional area being a cross sectional area of said first pipe section is essentially the same as a second cross sectional area being a cross sectional area of said space formed between said first pipe section and said second pipe section.

7. The pulsation damper according to claim 1, further comprising a volume adding element placed in said first pipe section.

8. The pulsation damper according to claim 7, wherein a third cross sectional area being a cross sectional area of a space formed between said first pipe section and said volume adding element is essentially the same as a second cross sectional area being a cross sectional area of said space formed between said first pipe section and said second pipe section.

9. The pulsation damper according to claim 1, wherein said first pipe section is arranged to enter in a mid section of said second pipe section.

10. The pulsation damper according to claim 1, further comprising a third pipe section, wherein said second pipe section is at least partly placed inside said third pipe section.

11. The pulsation damper according to claim 10, wherein said third pipe section has a non-circular cross section in at least one point.

12. The pulsation damper according to claim 10, wherein said first pipe section enters said third pipe section in an end section.

13. A pulsation damper system comprising
    a first pulsation damper according to claim 1, said first pulsation damper being connected to an outlet of a piston pump arrangement, and
    a second pulsation damper comprising a second pulsation damper pipe section, said first pulsation damper being placed inside said second pulsation damper pipe section, and said second pulsation damper pipe section being connected to an inlet of said piston pump arrangement.

14. A processing line comprising
    a piston pump, and
    a pulsation damper according to claim 1.

15. A homogenizer comprising
    a piston pump,
    a homogenizing device, and
    a pulsation damper according to claim 1.

16. A food processing line comprising a homogenizer according to claim 15.

17. The pulsation damper according to claim 1, wherein said second pipe section is connected to a homogenizer.

18. A pulsation damper configured to reduce pressure variations in a pipe system,
    the pulsation damper comprising a first pipe section and a second pipe section, the first pipe section being at least partly positioned inside the second pipe section to permit product to flow through the first pipe section and through a space formed between the first pipe section and the second pipe section, the space possessing a volume, the first pipe section possessing a cross-sectional shape enclosing a first volume and being made of an elastic material so that when pressure inside the first pipe section increases from a lower pressure state to a higher pressure state, the cross-sectional shape of the first pipe section changes to increase the first volume in the first pipe section and thereby damp pulsation, and the second pipe section possessing a cross-sectional shape and being made of an elastic material so that when pressure in the space between the first pipe section and the second pipe section increases from a lower pressure state to a higher pressure state, the cross-sectional shape of the second pipe section changes to increase the volume of the space between the first pipe section and the second pipe section and thereby damp pulsation.

19. A pulsation damper configured to reduce pressure variations in a pipe system, the pulsation damper comprising:

a first pipe section and a second pipe section;

the first pipe section being at least partly inside the second pipe section to permit a product to flow through the first pipe section and through a space formed between the first pipe section and the second pipe section; and at least one of the first and second pipe sections possessing a non-circular elliptical cross-sectional shape and being made of an elastic material so that when pressure inside the at least one of the first and second pipe sections increases from a lower pressure state to a higher pressure state, the cross-sectional shape of the at least one of the first and second pipe sections becomes less elliptical to damp pulsation.

20. The pulsation damper according to claim 19, wherein the at least one of the first and second pipe sections is the first pipe section, and the second pipe section possesses a non-circular elliptical cross-sectional shape and is made of an elastic material so that when pressure inside the space formed between the first pipe section and the second pipe section increases from a lower pressure state to a higher pressure state, the cross-sectional shape of the second pipe section becomes less elliptical to damp pulsation.

* * * * *